(12) United States Patent
Laimboeck et al.

(10) Patent No.: US 10,384,528 B2
(45) Date of Patent: Aug. 20, 2019

(54) HYBRID VEHICLE AND GENERATING SET

(71) Applicant: Obrist Technologies GmbH, Lustenau (AT)

(72) Inventors: Franz Laimboeck, Thal (AT); Frank Obrist, Bregenz (AT)

(73) Assignee: OBRIST TECHNOLOGIES GMBH, Lustenau (AT)

( * ) Notice: Subject to any disclaimer, the term of this patent is extended or adjusted under 35 U.S.C. 154(b) by 0 days.

(21) Appl. No.: 15/524,719

(22) PCT Filed: Nov. 2, 2015

(86) PCT No.: PCT/EP2015/075364
§ 371 (c)(1),
(2) Date: May 5, 2017

(87) PCT Pub. No.: WO2016/071247
PCT Pub. Date: May 12, 2016

(65) Prior Publication Data
US 2018/0111469 A1    Apr. 26, 2018

(30) Foreign Application Priority Data
Nov. 7, 2014 (DE) .......................... 10 2014 116 302

(51) Int. Cl.
*B60K 6/46* (2007.10)
*B60K 6/26* (2007.10)
(Continued)

(52) U.S. Cl.
CPC ................. *B60K 6/46* (2013.01); *B60K 6/26* (2013.01); *B60K 6/28* (2013.01); *B60K 6/40* (2013.01);
(Continued)

(58) Field of Classification Search
CPC ... B60K 6/46; B60K 6/28; B60K 6/40; B60K 13/04; B60K 6/26; B60K 2006/268;
(Continued)

(56) References Cited

U.S. PATENT DOCUMENTS 5,069,306 A    12/1991  Inoue et al.
9,103,276 B2 *  8/2015  Obrist ..................... B60K 6/24
(Continued)

FOREIGN PATENT DOCUMENTS

DE    10 2010 018 020 A1   10/2011
DE       102010018020 A1   10/2011
(Continued)

OTHER PUBLICATIONS

German Search Report for German Patent Application No. 102014116302.8, dated Jul. 8, 2017, 7 pages.
(Continued)

*Primary Examiner* — James A Shriver, II
*Assistant Examiner* — James J Triggs
(74) *Attorney, Agent, or Firm* — Westman, Champlin & Koehler, P.A.

(57) ABSTRACT

The invention relates to a multi-track passenger motor vehicle, in particular a hybrid vehicle, comprising a generating set, which has at least one generator that can be driven by a reciprocating piston engine, a battery and at least one electric motor. The reciprocating piston engine, the generator and the electric motor, which can be mechanically coupled to at least one driving wheel of the vehicle, are connected in series in order to drive the vehicle. The generating set, consisting of the reciprocating piston engine and the generator, has a depth extending in the longitudinal direction of the vehicle and a width extending transversely to the longitudinal direction of the vehicle, the width being a maximum 750 mm, especially a maximum 700 mm, in particular a maximum 660 mm, in particular a maximum 640 mm, and the depth being a maximum 310 mm, especially a maximum 280 mm, in particular a maximum 260 mm, and in particular a maximum 250 mm.

16 Claims, 2 Drawing Sheets

Figure 1:
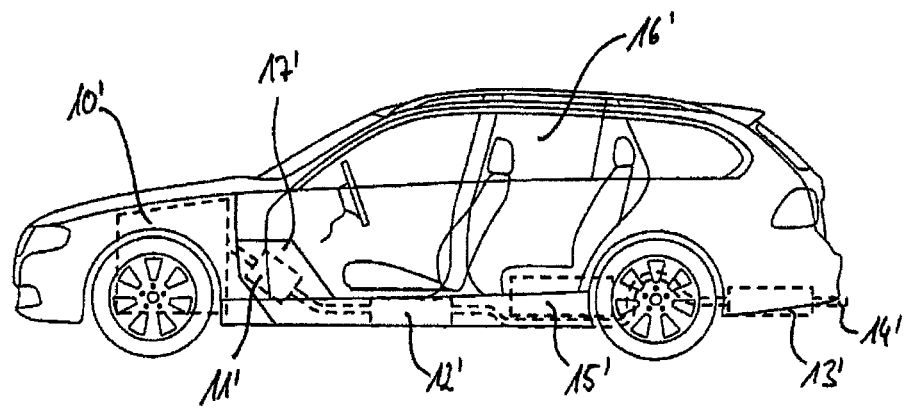

(51) Int. Cl.
*B60K 6/28* (2007.10)
*B60K 6/40* (2007.10)
*B60K 13/04* (2006.01)

(52) U.S. Cl.
CPC ........ *B60K 13/04* (2013.01); *B60K 2006/268* (2013.01); *B60Y 2200/92* (2013.01); *B60Y 2304/01* (2013.01); *Y02T 10/6217* (2013.01); *Y10S 903/951* (2013.01)

(58) Field of Classification Search
CPC ............ Y02T 10/6217; B60Y 2200/92; B60Y 2304/01; Y10S 903/951
See application file for complete search history.

(56) References Cited

U.S. PATENT DOCUMENTS

| | | |
|---|---|---|
| 2012/0312622 A1 | 12/2012 | Hoermandinger et al. |
| 2013/0035817 A1 | 2/2013 | Bahar et al. |

FOREIGN PATENT DOCUMENTS

| | | |
|---|---|---|
| DE | 102010024896 A1 | 1/2012 |
| DE | 102011050986 A1 | 12/2012 |
| DE | 102014203507 A1 | 9/2014 |
| JP | H01-262219 A | 10/1989 |
| JP | H07-500065 A | 1/1995 |
| JP | 2008-155828 A | 7/2008 |
| WO | 20100145628 A1 | 12/2010 |
| WO | 2012/056275 A1 | 5/2012 |
| WO | 2012/069199 A2 | 5/2012 |
| WO | 20120056275 A1 | 5/2012 |
| WO | 20120069199 A2 | 5/2012 |
| WO | 2012/163902 A1 | 12/2012 |
| WO | 20120163902 A1 | 12/2012 |

OTHER PUBLICATIONS

International Preliminary Report and Written Opinion for PCT/EP2015/075364, dated May 18, 2017, 12 pages.

International Search Report and Written Opinion for International Application No. PCT/EP2015/075364, dated May 3, 2016, 11 pages.

Notification of Reasons for Refusal for Japanese Patent Application No. 2017-525119, dated Nov. 28, 2018, 14 pages.

\* cited by examiner

HYBRID VEHICLE AND GENERATING SET

CROSS-REFERENCE TO RELATED APPLICATION

This Application is a Section 371 National Stage Application of International Application No. PCT/EP2015/075364, filed 2 Nov. 2015 and published as WO 2016/071247 A2 on 12 May 2016, in German, the contents of which are hereby incorporated by reference in their entirety.

DESCRIPTION

The invention relates to a multi-track passenger motor vehicle, in particular a hybrid vehicle, comprising a generating set, which comprises at least one generator that can be driven by a reciprocating piston engine, a battery and at least one electric motor, the reciprocating piston engine, the generator and the electric motor that can be mechanically coupled to at least one drive wheel of the vehicle are connected to one another in series for driving the vehicle.

In the case of serial hybrid drives, the drive is realised predominantly, if not exclusively, purely electrically. There, the electric energy is generated by an internal combustion engine in connection with a generator within the vehicle. The battery as energy buffer makes possible the total energetic decoupling of the internal combustion engine from the vehicle drive. Serial hybrid drives are therefore suitable preferably with a view to the increasing emission control regulations, since the internal combustion engine can be operated in the best possible efficiency range or emission-optimised independently of the current driving task.

The invention is based on the object of making available a serial hybrid drive for a multi-track passenger motor vehicle, which can be realised with relatively minor expenditure, combining as low-emission a vehicle drive as possible with optimum driving conditions and additionally a particularly quiet—noise-minimised and largely vibration-free—operation of the entire drive unit with a space-saving construction.

According to the invention, this object is solved in that the generating set constructed of reciprocating piston engine and generator has, in vehicle longitudinal direction, a depth and, transversely to the vehicle longitudinal direction, a width, wherein the amounts to maximally 750 mm, in particular maximally 700 mm, in particular maximally 660 mm, in particular maximally 640 mm, and the depth maximally 310 mm, in particular maximally 280 mm, in particular maximally 260 mm, in particular maximally 250 mm.

These construction dimensions, which are attainable by a compact construction unit of the generating set consisting of reciprocating piston engine and generator, make it possible in the front region of the vehicle to accommodate larger wheel houses for the steerable wheels and thus more steering lock and smaller turning circles. In addition to this, a substantially enlarged crash-collapsible zone can be preferentially accommodated, with suitable arrangement of this generating set, between the front axle and a passenger compartment, in particular a fire wall running transversely to the driving direction between passenger and engine compartment in the front region of the vehicle in the event of a crash, which also makes possible an improved pedestrian protection.

The generating set according to the invention with reciprocating piston engine and generator can be constructed as a unit that can be in particular uniformly handled, be of compact construction, and can preferentially in a housing that can be thermally insulated and/or insulated from vibration and/or sound-insulated.

The compact construction of this generating set can be achieved in particular in that the reciprocating piston engine is preferentially constructed of two piston-cylinder units in tandem arrangement, the two piston-cylinder units operating on two counter-rotatable crankshafts.

In order to be able to achieve as quiet, low-vibration operation of the generating set or of the internal combustion engine as possible it is practical upon arrangement of merely one generator to arrange on one of the two crankshafts a balancing shaft that is rotatable in opposite direction to the generator or upon the arrangement of two generators, to connect each of these in terms of drive to one of the two crankshafts.

The generating set can be constructed in a particularly compact manner in particular when the two piston-cylinder units in tandem arrangement are equipped with counter-rotatable crankshafts, on which, radially overlapping one another, a generator each is arranged. Here, the generators can each be mounted on opposite ends of the crankshafts or in axial direction of the crankshafts offset on the same.

The drive of a passenger motor vehicle according to the invention can be preferentially effected via at least one drive wheel on a rear axle. However it is likewise conceivable that a plurality of electric motors is provided, wherein at least one first electric motor is coupled to a drive wheel on the front axle, and a second electric motor to a drive wheel on the rear axle. It is obvious to the person skilled in the art that an all-wheel drive, for example by means of wheel hub motors, can be easily realised with this vehicle concept.

For safety reasons, for example in the event of a crash, the battery, in the case of a vehicle according to the invention, should be arranged below the passenger compartment and ideally in the particularly crash-stable region between the B-pillars of the vehicle. Here, the battery should be preferentially arranged in a battery housing, the battery housing being simultaneously integrated in the chassis frame of the vehicle so that it forms a supporting structure for the vehicle. It is particularly advantageous when the battery housing receiving the battery is simultaneously constructed as support structure for fastening seat rails for occupant seats in the vehicle, for example the two front seats.

The battery consists of at least two cell blocks, which are formed by a plurality of mechanically and electrically connected round cells, wherein between the cell blocks at least one through-flow capable cooling element can be arranged. The battery or the cell blocks of the battery can be preferentially arranged so that they can be braced via a bag with a variable internal volume relative to the battery housing.

In a preferred embodiment, the generating set for a multi-track passenger motor vehicle is equipped with a reciprocating piston engine having at least one generator wherein these can be mechanically coupled to one another and wherein the reciprocating piston engine preferentially comprises two pistons which are guided in two cylinders in tandem arrangement and two counter-rotatable crankshafts and, here, has a width of maximally 750 mm, in particular maximally 700 mm, in particular maximally 660 mm, in particular maximally 640 mm and a depth of maximally 310 mm, in particular maximally 280 mm, in particular maximally 260 mm, in particular maximally 250 mm and a height of maximally 580 mm, preferentially maximally 560 mm.

The exhaust system of the reciprocating piston engine should, for space reasons and for the simple construction within the generating set, be arranged in a plane running in the middle between the cylinders; its passage through the set housing is preferentially effected in a heat and vibration-insulated manner. Outside the set housing, the exhaust system comprises at least one silencer and a tailpipe. Over the tailpipe, a flow pipe running all around can be arranged so that between the flow pipe and the tailpipe an annular ejector duct for accelerating the exhaust gas discharge and for cooling the exhaust system under the effect of headwind is created.

In a particularly preferred embodiment, the silencer of the exhaust system extends in front of and below a centre console, which substantially runs in longitudinal direction of the vehicle and at least partially runs bulged out into the passenger compartment; the discharge opening of the tailpipe and of the ejector duct is arranged in the region of the end of the centre console. This advantageous configuration of the exhaust system is made possible by the reciprocating piston engine with two piston-cylinder units. The short design or the short course of the exhaust system with silencer and if applicable catalytic converters merely as far as into the region of the centre console of the passenger compartment at most allows providing the discharge opening of the tailpipe directly below this centre console.

As already mentioned, this space-saving construction or installation of a generating set according to the invention allows a configuration of the front region of a vehicle that has not been considered possible up to now (more steering lock, greater crash-collapsible zone etc.) or with same vehicle size a substantially larger and better utilisable interior.

The design of the drive unit makes it possible to entirely omit a centre tunnel as the case may be.

With suitable arrangement, a low centre of gravity for the overall vehicle is attainable without problems.

In the figures of the drawing, the prior art compared with an exemplary embodiment of the subject of the invention is schematically shown. By way of this representation, the characterising features, details and particularities of the subject of the invention will be explained in more detail in the following.

Figure 2:
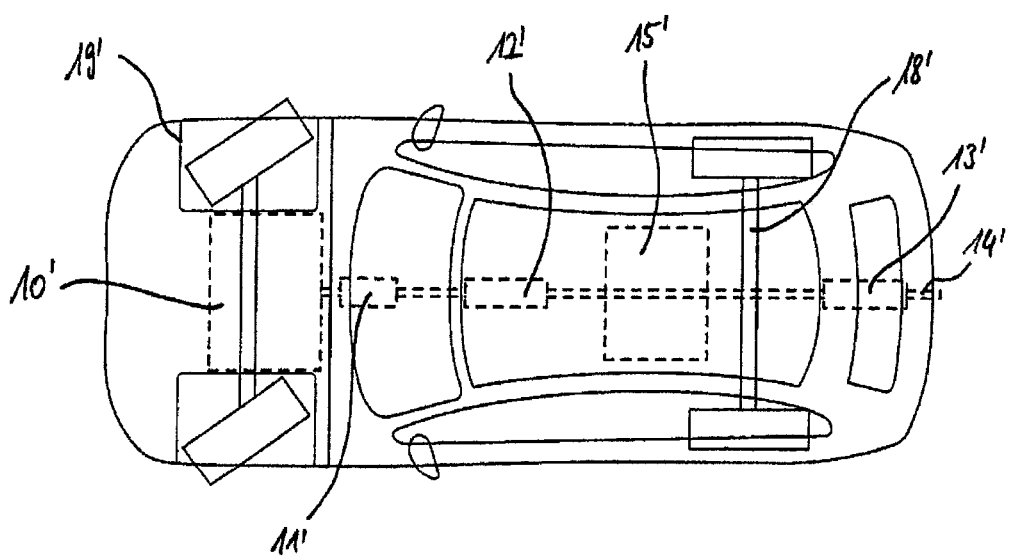
Figure 3:
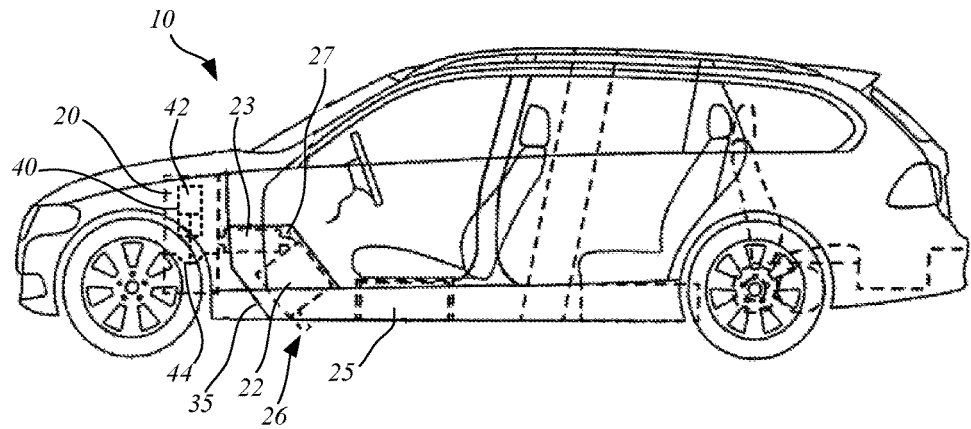
Figure 4:
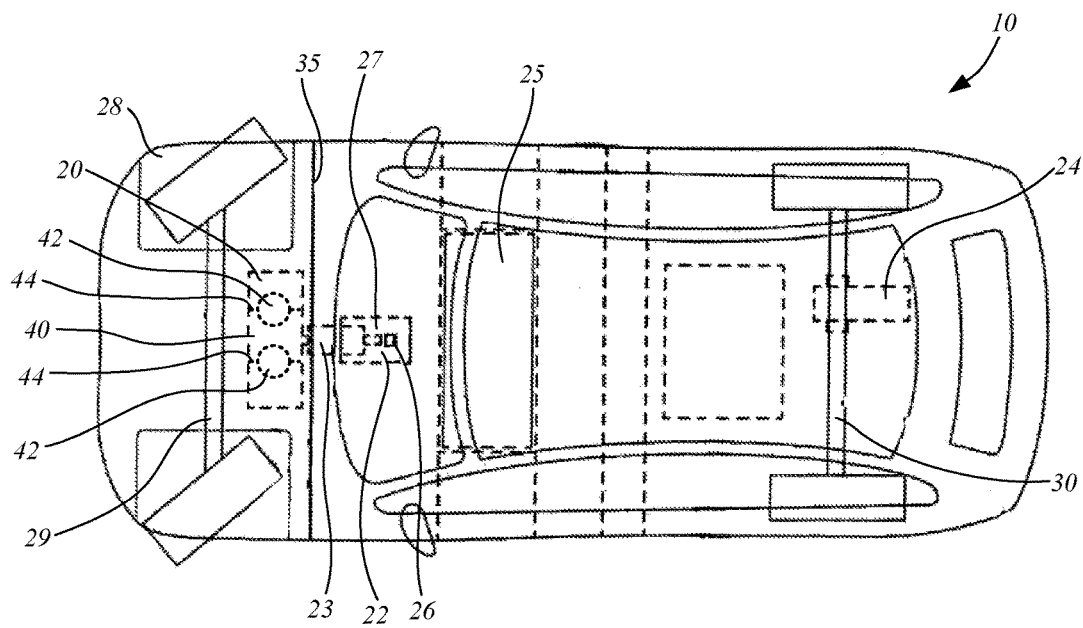

It shows:

FIG. 1 a schematic view of a vehicle according to the prior art;

FIG. 2 a schematic top view of a vehicle constructed according to the prior art;

FIG. 3 a view of a vehicle constructed with a compact generating set according to the invention in schematic representation and FIG. 4 a top view of the vehicle according to FIG. 3.

A vehicle 16' according to FIGS. 1 and 2 is equipped in its front region with a driving set 10', consisting of reciprocating piston engine, one or more generators and at least one electric motor and if appropriate with auxiliary sets. From FIGS. 1 and 2 it becomes evident that the relatively large-construction driving set 10' substantially limits the possible configurations in the front region of a vehicle 16' and in particular also the space that is available for the wheel houses 19' and thus the turning circle of the vehicle. In the configuration of the crash-collapsible zone for the event of a crash and for pedestrian safety, limited space specifications have to be handled which additionally are impaired by the usual aerodynamic facts.

Usually, in the case of the prior art, the energy storage unit 15', in the case of hybrid vehicles, is arranged below the rear seat row of the vehicle and directly in front of the rear axle 18'. The exhaust system 11', 12', 13', 14' is routed, in the conventional manner, starting out from the driving set 10' via a centre console 17' running along below the floor of the vehicle 16' and, comprising silencers, catalytic converters etc., as far as to a tailpipe 14' of the exhaust system arranged in the rear region of the vehicle 16'.

In contrast with the vehicle shown in FIGS. 1 and 2, a vehicle 10 constructed according to the invention (see FIGS. 3 and 4) comprises, in the front region, a generating set of highly compact construction, comprising a reciprocating piston engine 40 with at least one generator. This generating set 20 of compact construction is preferentially arranged substantially above or behind the front axle 29 and in front of a firewall 35 separating the passenger compartment from the engine compartment. The generating set 20 with the reciprocating piston engine 40 and the generator can be accommodated as a unit within a uniformly handleable joint unit housing of compact construction, which can be preferentially embodied in a thermally, vibration and sound-insulated manner.

As FIGS. 3 and 4 clearly show in contrast with the representations in FIGS. 1 and 2, the compact unit of the generating set 20 allows a substantially freer configuration of the front area of a vehicle with respect to crash safety and pedestrian protection and beyond this accommodating greater wheel houses 28 and thus realising a substantially greater steering lock of the steered wheels and because of this a reduced turning circle.

Furthermore, the reciprocating piston engine 40 with two piston-cylinder units 42 in tandem arrangement operating on counter-rotatable crankshafts 44 allows the installation of an exhaust system that is short in design and thus favourable in weight and space-saving.

Through the space-saving construction of the complete generating set 20 which can be favourably accommodated in terms of space because of its compactness and its corresponding installation, a greater space offer can be achieved in the interior with identical outside dimensions compared with a conventional vehicle with internal combustion engine or hybrid drive so that for example a five plus two seater (see schematic representation in FIG. 3) or even a seven-seater becomes easily possible.

Details regarding the construction of the generating set can be taken for example from DE 102014115043.0.

The drive of a passenger motor vehicle according to the invention can be effected both via the rear wheels and also via the front wheels—and as already mentioned—also in all-wheel embodiment. In the schematically shown exemplary embodiment an electric motor 24 for driving via the rear axle 30 of the vehicle 10 is provided. A driving concept is considered particularly preferable, in which via an electric motor a drive wheel on the front axle 29 (not shown in the drawing) and a further electric motor 24 for driving a wheel on the rear axle 30 is provided; a diagonally offset arrangement of the driven wheels is particularly favourable for the driving characteristics of the vehicle in this case. Likewise conceivable is a drive version with for example four wheel hub electric motors or an all-wheel version each with an electric motor on the front and on the rear axle. Each of these drive versions can be equipped with suitable transmission units, for example differentials etc. for the appropriate shifting or for balancing different drive moments acting on the wheels including specifically different distribution of moments over the wheels, so-called torque vectoring.

Because of the relatively high electric energy density, the arrangement of the battery 25 has been given particular attention in the vehicle concept according to the invention: the zone on the vehicles which from all reports regarding crash reconstructions is the least affected by deformations is the substantially central region between the B-pillars and suitably spaced from these. Accordingly it is practical to arrange the battery in this region wherein this central region should not take up more than 70%, preferably not more than 60% of the entire vehicle width in the underbody of the vehicle. The battery should be accommodated in a battery housing which at the same time forms a supporting structure in the chassis frame of the vehicle which is stable anyhow or which is arranged in a suitably stable moulding in the underbody/vehicle frame. Ideally, this support structure of the underbody/vehicle frame can be designed so that it simultaneously forms a support structure for fastening the seat rails for occupant seats of the vehicle; because of the position in the vehicle (region of the B-pillars) these are preferentially the front seats of a vehicle.

The battery 25 should comprise at least one cell block, preferentially at least two cell blocks, which are formed by a plurality of round cells which are mechanically and electrically connected to one another. Between battery housing and cell block or cell blocks, cooling elements that can be flowed through for cooling the battery cells can be arranged. In the case of two or more cell blocks, at least one or further cooling elements that can be flowed through can be additionally arranged between the individual cell blocks.

The cell blocks of the battery 25 can be encased entirely or largely by one or more pressure bags with a variable internal volume, with which the cell blocks can be braced so as to be protected relative to the battery housing and are securely arranged in the battery house.

As mentioned, furthermore, it is particularly practical to arrange the exhaust system of the reciprocating piston engine within the generating set 20 in a space-saving manner with a relatively short course in a plane in the middle between the cylinders. After the exit of the exhaust system from the set housing of the generating set 20, the exhaust system can be equipped with the technically necessary components for example silencer 22, catalytic converter 23 etc.; these can be arranged in a suitably secure and space-saving arrangement in or under a centre console 27 which is substantially arranged in longitudinal direction of the vehicle and, bulged out, at least partly projects into the front foot well of the passenger compartment. Depending on the specific requirements, the exhaust system can end with a tailpipe 26 centrally to middle in the middle vehicle region below the vehicle floor, practically with gas outlet openings substantially directed in the direction of the road. The tailpipe 26 in this case can end at the height of the foot region of driver or front passenger (see FIGS. 3 and 4 in the drawing); with greater space requirement for the exhaust system it is conceivable to arrange the outlet opening of the tailpipe 26 in the region approximately in front of the front seats and in front or below the battery housing.

With such an arrangement of the exhaust system, the for example existing stipulations in terms of the outlet temperatures of engine exhaust gases (for example in the US) for preventing fires have to be mandatorily observed. For this reason it can be practical to sheath the exhaust gas tailpipe 26 circumferentially at a distance with a flow pipe that is open on both sides (i.e. towards the front and to the back), which with the tailpipe itself forms an annular ejector duct. While driving, the tailpipe 26 is continuously cooled accordingly by the air flow within the ejector duct so that at any rate on the outside of the exhaust system (e.g. ejector duct) a lowering of the surface temperature to a harmless level is achieved.

Here, the cooling is based on the sub-pressure that is created by the tailpipe 26 with its high gas temperature and the relatively high gas outlet velocity formed because of this in the flow tube surrounding the same or in the ejector duct formed between tailpipe and flow tube. By way of this sub-pressure, cooling air is sucked in wherein the suction effect persists to a certain degree even in stationary operation. This cooling effect can be supported by the air flow in the ejector duct for example upon arrangement of the exhaust system in the flow-unfavourable region in that an air flow is conducted to the ejector duct via a feeder pipe arranged for example on the front side of the vehicle.

LIST OF REFERENCE NUMBERS

16' Vehicle
10' Drive unit
15' Energy storage unit
11', 12', 13', 14' Exhaust system
14' Tailpipe of the exhaust system
17' Centre console
18' Rear axle
19' Wheel house
10 Vehicle
20 Generating set
22 Silencer
23 Catalytic converter
24 Electric motor
25 Battery
26 Tailpipe
27 Centre console
28 Wheel house
29 Front axle
30 Rear axle
35 Fire wall

The invention claimed is:

1. A multi-track passenger motor vehicle, in particular hybrid vehicle, with a generating set comprising at least one generator that is driven via a reciprocating piston engine, with a battery and at least one electric motor, wherein the reciprocating piston engine, the generator and the electric motor that is couplable to at least one drive wheel of the vehicle for driving the vehicle are connected in series with one another, characterized in that the generating set constructed of reciprocating piston engine and generator in vehicle longitudinal direction has a depth and transversely to the vehicle longitudinal direction a width, wherein the width amounts to maximally 750 mm and the depth amounts to maximally 310 mm and wherein the reciprocating piston engine comprises two piston-cylinder units in tandem arrangement, which operate on two counter-rotatable crankshafts.

2. The passenger motor vehicle according to claim 1, characterized in that the generating set is substantially arranged above the front axle or between the front axle and a passenger compartment.

3. The passenger motor vehicle according to claim 1, characterized in that the generating set (20) with the reciprocating piston engine and the generator forms an in particular uniformly handleable compact unit that is preferentially arranged in a set housing that is insulated thermally or with respect to vibration or with respect to sound.

4. The passenger motor vehicle according to claim 1, characterized in that the generating set comprises a single generator and a balancing shaft that is counter-rotatable relative to the generator.

5. The passenger motor vehicle according to claim 1, characterized in that the generating set comprises two generators which are each drive-connected to one of the two crankshafts.

6. The passenger motor vehicle according to claim 1, including at least one drive wheel on a rear axle of the vehicle.

7. The passenger motor vehicle according to claim 1, characterized in that a plurality of electric motors is provided, wherein at least one first electric motor is coupled to a drive wheel on the front axle and a second electric motor to a drive wheel on the rear axle.

8. The passenger motor vehicle according to claim 1, characterized in that the battery is arranged below a passenger compartment of the vehicle.

9. The passenger motor vehicle according to claim 1, characterized in that the battery comprises a battery housing which forms a supporting structure of a chassis frame of the vehicle.

10. The passenger motor vehicle according to claim 8, characterized in that the battery housing receiving the battery is arranged within a support structure in the chassis frame.

11. The passenger motor vehicle according to claim 8, characterized in that the battery or the battery housing receiving the battery is substantially arranged in a central region between the B-pillars, which in transverse direction of the vehicle does not take up more than 70% of the vehicle width.

12. The passenger motor vehicle according to claim 1, characterized in that the battery comprises at least one cell block, preferentially at least two cell blocks, which are formed by a plurality of round cells which are mechanically and electrically connected to one another, and at least one flow through cooling element.

13. The passenger motor vehicle or generating set for a passenger motor vehicle according to claim 1, characterized in that the exhaust system of the reciprocating piston engine within the generating set is arranged in a plane running in the middle between the cylinders and outside of the set housing comprises a silencer and a tailpipe.

14. A vehicle or generating set according to claim 13, characterized in that a flow pipe extends over the tailpipe, wherein between the flow pipe and the tailpipe an annular ejector ducts is formed.

15. The passenger motor vehicle or generating set for a passenger motor vehicle according to claim 13, characterized in that the silencer is arranged in front of and below a centre console running in the underbody of the vehicle substantially in longitudinal direction and at least partially extending into the region of the passenger compartment and the outlet opening of the tailpipe and of the ejector duct is arranged at the end of the centre console.

16. The vehicle according to claim 13, characterized in that the silencer projects into the centre console of the passenger compartment and an outlet opening of the tailpipe is arranged directly below the centre console.

* * * * *